(12) United States Patent
Barsoum

(10) Patent No.: US 7,277,512 B1
(45) Date of Patent: Oct. 2, 2007

(54) SYSTEMS AND METHODS FOR ACCOUNTING FOR INTERCARRIER INTERFERENCE IN TRANSMISSION SYSTEMS

(75) Inventor: Maged F. Barsoum, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 834 days.

(21) Appl. No.: 10/368,431

(22) Filed: Feb. 20, 2003

(51) Int. Cl.
    *H04B 1/10* (2006.01)

(52) U.S. Cl. .................. 375/346; 375/220; 375/221; 375/222; 375/260; 375/224; 370/430; 370/477; 370/480; 370/208; 370/210; 379/93.01

(58) Field of Classification Search .......... 375/220, 375/221, 222, 260, 285, 346, 377, 224, 227; 370/430, 477, 480, 208, 210, 206; 379/93.01
See application file for complete search history.

(56) References Cited

U.S. PATENT DOCUMENTS

| 5,228,062 | A | * | 7/1993 | Bingham | 375/344 |
| 5,983,111 | A | * | 11/1999 | Kim | 455/466 |
| 6,370,188 | B1 | * | 4/2002 | Wu et al. | 375/222 |
| 6,452,907 | B1 | * | 9/2002 | Levin | 370/252 |
| 6,456,653 | B1 | * | 9/2002 | Sayeed | 375/227 |
| 6,870,888 | B1 | * | 3/2005 | Shapiro et al. | 375/260 |
| 6,999,507 | B2 | * | 2/2006 | Jin | 375/224 |
| 7,050,825 | B2 | * | 5/2006 | Ginesi et al. | 455/522 |
| 2003/0114127 | A1 | * | 6/2003 | Baldwin | 455/245.1 |
| 2003/0210645 | A1 | * | 11/2003 | Gummadi et al. | 370/203 |
| 2004/0005010 | A1 | * | 1/2004 | He et al. | 375/260 |

* cited by examiner

*Primary Examiner*—Chieh M. Fan
*Assistant Examiner*—Siu M. Lee
(74) *Attorney, Agent, or Firm*—Harrity Snyder LLP

(57) ABSTRACT

A device that transmits data using discrete multitone modulation includes a memory that stores intercarrier interference (ICI) information for each of the tones used to transmit data. The device also includes logic that receives signals transmitted from another device, estimates a noise value for each tone and adds the estimated noise to the ICI information to determine an effective noise value. The effective noise value may then be used to generate an effective signal-to-noise ratio (SNR). The effective SNR may then be used by a loading controller to determine bit loading information for each tone. The bit loading information may be transmitted to the other device, which may then use this information to identify the appropriate number of bits to load in each tone when transmitting data.

16 Claims, 8 Drawing Sheets

SYSTEMS AND METHODS FOR ACCOUNTING FOR INTERCARRIER INTERFERENCE IN TRANSMISSION SYSTEMS

TECHNICAL FIELD

The present invention relates generally to network communications and, more particularly, to accounting for interference in a data transmission system.

BACKGROUND ART

In many transmission systems, both the receiver and transmitter include a clock that controls various activities. The clock is typically a crystal oscillator that controls processing-related activities associated with transmitting and receiving data over a channel. Due to minor variations in the clocks, the receiver and transmitter clocks are often offset from each other, i.e., the frequency of the clock at the receiver is often different from that at the transmitter.

One problem associated with mismatched clock frequencies is that the receiver may be unable to recover the transmitted signal without errors. For example, a discrete multitone (DMT) transmission system may transmit data over 256 distinct carriers (also referred to as tones) with each carrier being separated by 4.3125 KHz. When the transmitting and receiving clocks are mismatched, received tones may leak into one another. This is known as Intercarrier Interference (ICI). When the ICI is particularly high, the receiver may be unable to recover the transmitted signal without errors.

DISCLOSURE OF THE INVENTION

There exists a need for systems and methods for accounting for ICI in data transmission systems.

These and other needs are met by the present invention, where an effective signal-to-noise ratio (SNR) that accounts for ICI is determined. A receiving station may estimate the ICI per tone and the noise per tone associated with data transmitted from a transmitting station. The receiving station may add the ICI and noise per tone values to generate an effective noise per tone value and then determine an effective signal-to-noise ratio (SNR) using the effective noise per tone. The effective SNR may then be used to determine bit loading information. The receiving station may transmit the bit loading information to the transmitting station, which may use the bit loading information when transmitting data.

According to one aspect of the invention, a first device that transmits data over a network medium is provided. The device includes a memory configured to store ICI information for each of a number of respective tones used in a discrete multitone transmission system. The device also includes logic configured to receive data signals transmitted on the plurality of tones, estimate a noise value for each tone, generate an effective noise value for each tone using the ICI information and the estimated noise value for each tone and determine a signal-to-noise ratio (SNR) for each tone using the effective noise values. The device also includes a transmitter configured to transmit bit loading information to a second device, the bit loading information being based on the determined SNR.

Another aspect of the present invention provides a method in a first network device that transmits data using DMT modulation. The method includes storing ICI information in a memory, receiving a number of signals transmitted on a number of tones, estimating an amount of noise associated with each tone and estimating an amount of signal energy associated with each tone. The method also includes calculating an effective noise value for each of the tones using the ICI information and the estimated amount of noise associated with each of the tones. The method further includes calculating a SNR for each of the tones using the estimated amount of signal energy and the effective noise value for each of the tones and determining bit loading information for each tone based on the SNR for each of the tones.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation represent like elements throughout.

BEST MODE FOR CARRYING OUT THE INVENTION

Figure 1:
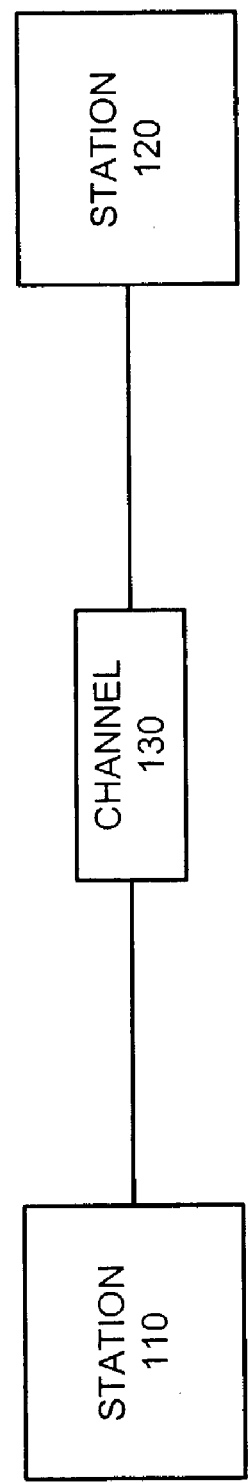
FIG. 1 is a block diagram of an exemplary network in which methods and systems consistent with the present invention may be implemented.

FIG. 1 is a block diagram of an exemplary network 100 in which systems and methods consistent with the present invention may be implemented. The exemplary network 100 includes stations 110 and 120 connected via transmission channel 130. Stations 110 and 120 may include one or more devices capable of transmitting and/or receiving data via channel 130. For example, stations 110 and 120 may transmit and receive data over channel 130 using DMT modulation techniques.

Channel 130 may include a wired or wireless transmission channel. For example, channel 130 may include conventional telephone wiring, e.g., twisted pair copper wire. Alternatively, channel 130 may include coaxial cable, a radio frequency (RF) link or some other medium that permits data to be transmitted between stations.

The number of components illustrated in FIG. 1 is provided for simplicity. A typical network may include more stations and/or transmission channels than illustrated in FIG. 1. In addition, channel 130 may connect to other networks, such as the public switched telephone network (PSTN) (not shown).

Figure 2:
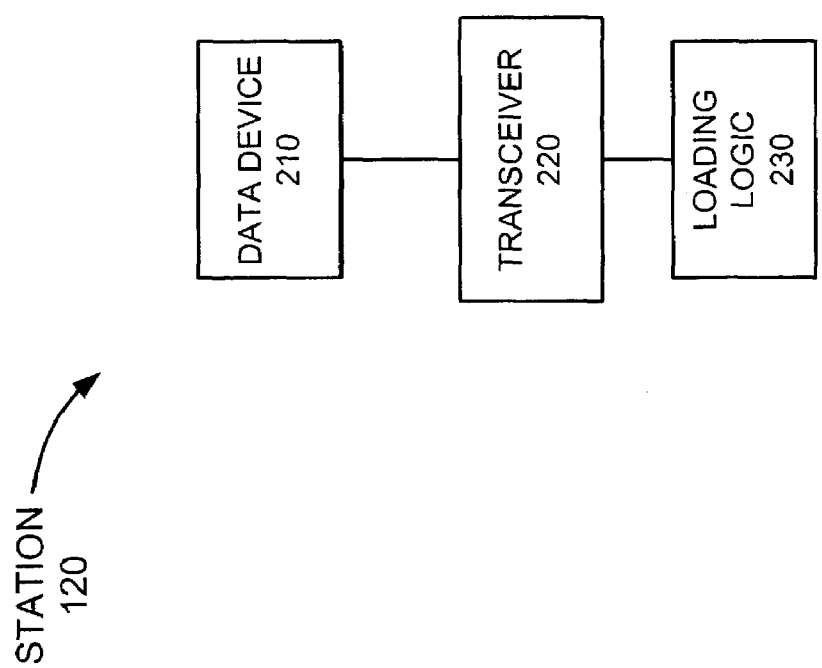
FIG. 2 is a block diagram of an exemplary configuration of a station of FIG. 1 consistent with the present invention.

FIG. 2 illustrates an exemplary configuration of station 120 of FIG. 1 in an implementation consistent with the present invention. It will be appreciated that station 110 may be similarly configured. Station 120 may include a data device 210, a transceiver 220 and loading logic 230. It should be understood that station 120 may include other components (not shown) that aid in the reception, transmission and processing of data.

Data device 210 may include some type of computing device, such as a personal computer, laptop, personal digital assistant (PDA) or some other intelligent processing device. Data device 210 may also include a media access controller (MAC) that transmits and receives data packets to/from transceiver 220.

Transceiver 220 may include one or more physical layer transceivers that transmit and receive data via channel 130. In accordance with an exemplary embodiment of the present invention, stations 110 and 120 communicate using DMT modulation techniques. Accordingly, transceiver 220, consistent with the present invention, may include a transmitter portion that receives a digital data stream from data device 210 and converts the data into a series of tones. As discussed previously, 256 carriers or tones may be used to carry data in a DMT transmission system with each tone being separated by 4.3125 KHz. Alternatively, other numbers of tones may be used to carry the data and other separations between tones may be used. Transceiver 220 may also include a receiver portion that receives data transmitted in accordance with a DMT protocol and converts received tones into a serial bit stream, as described in more detail below.

Loading logic 230 may analyze signals received from station 110 and determine the number of bits that may be loaded in each tone when station 110 transmits data to station 120. Station 120 may then transmit this bit loading information to station 110 so that station 110 will load the appropriate number of bits per tone when transmitting data to station 120. Station 120 may optionally use this information when loading data for transmission to station 110. In accordance with an exemplary implementation of the present invention, loading logic 230 takes into account ICI when determining the number of bits to load in each tone, as described in more detail below.

Figure 3:
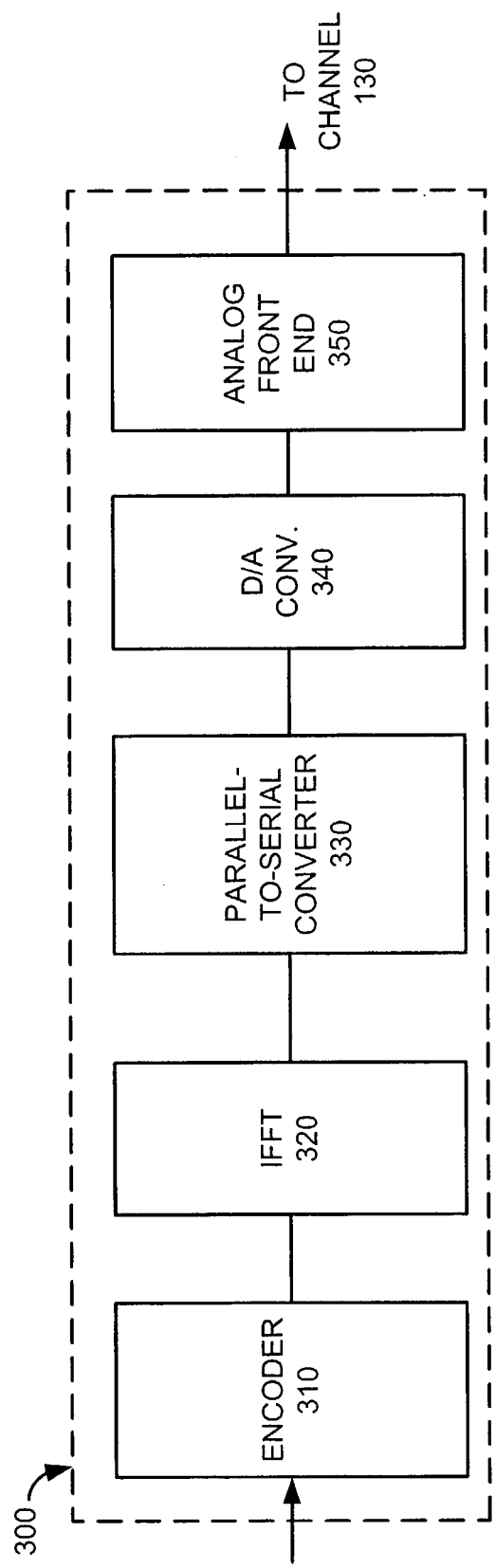
FIG. 3 is an exemplary detailed block diagram of a transmitter portion of the transceiver of FIG. 2, consistent with an implementation of the present invention.

As discussed above, transceiver 220 may include a transmitter portion and a receiver portion. FIG. 3 is an exemplary detailed diagram of the transmitter portion 300 of transceiver 220 (referred to as transmitter 300) according to an implementation consistent with the present invention. Transmitter 300 may include an encoder 310, Inverse Fast Fourier Transform (IFFT) logic 320, a parallel-to-serial converter 330, a digital-to-analog (D/A) converter 340 and an analog front end (AFE) 350.

Encoder 310 receives a stream of data bits from data device 210 and may organize the bits into groups. Encoder 310 encodes or maps the data bits into tones using, for example, a quadrature amplitude modulation (QAM) protocol by representing each grouping of bits with a discrete tone. In accordance with an exemplary implementation of the present invention, each tone may be modulated to carry up to 15 bits of data. Encoder 310 maps the designated number of bits to each respective tone and represents each tone with a complex number that indicates phase and amplitude information for that particular tone in the frequency domain.

IFFT logic 320 receives the complex numbers representing the tones from encoder 310. IFFT logic 320 converts the frequency domain information into time domain information. IFFT logic 320 may also add a cyclic prefix or guard band to the time domain information to eliminate the effects of InterSymbol Interference (ISI).

Parallel-to-serial converter 330 may convert the parallel time domain information from IFFT logic 320 into a serial signal stream. D/A converter 340 may convert the serial signal stream of data to an analog format and pass the analog signal to analog front end (AFE) 350. AFE 350 receives the analog waveforms transmits the analog waveforms on channel 130. AFE 350 may include a low-pass filter that filters the analog waveforms before transmitting the waveforms on channel 130.

Figure 4:
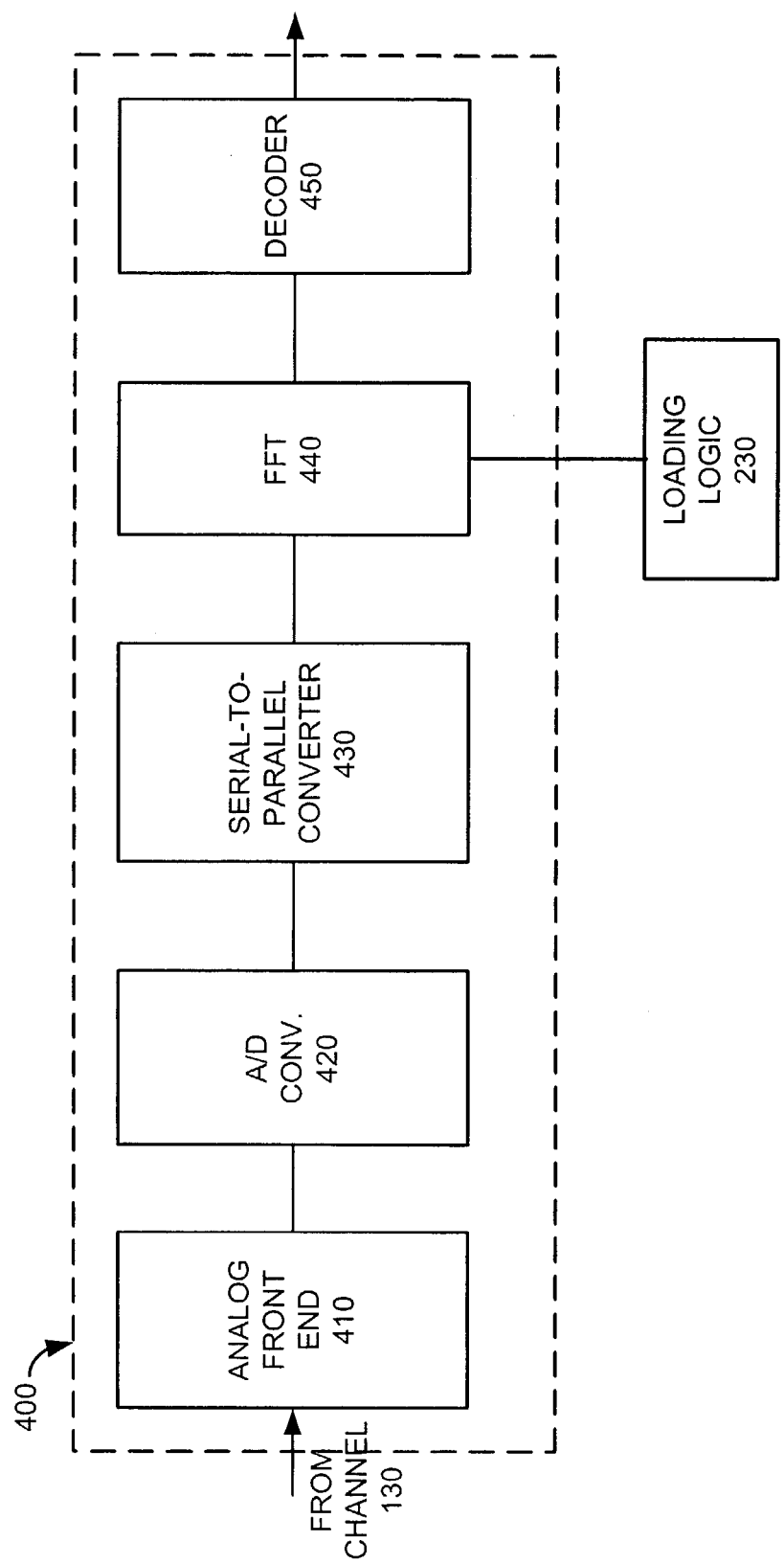
FIG. 4 is an exemplary detailed block diagram of a receiver portion of the transceiver of FIG. 2, consistent with an implementation of the present invention.

FIG. 4 is an exemplary detailed diagram of the receiver portion 400 of transceiver 220 (referred to as receiver 400) according to an implementation consistent with the present invention. Receiver 400 may include AFE 410, analog-to-digital converter 420, serial-to-parallel converter 430, FFT logic 440 and decoder 450. Receiver 400 essentially performs the reverse operation as transmitter 300, as described in more detail below.

AFE 410 receives analog waveforms transmitted on channel 130 and forwards these waveforms to A/D converter 420. AFE 410 may include an anti-aliasing filter that filters the received analog waveforms. A/D converter 420 converts the analog waveforms into a digital format. Serial-to-parallel converter 430 converts the serial waveform into a parallel format. Serial-to-parallel converter 430 may also remove the cyclic prefix from the signal.

FFT logic 440 transforms the parallel data from the time domain signal back into a frequency domain representation containing amplitude and phase information for each tone. FFT logic 440 also forwards the frequency domain information to loading logic 230, which determines the number of bits that should be loaded on each tone, as described in more detail below. Loading logic 230 may forward this information to transmitter 300, as described in more detail below. Decoder 450 decodes the frequency domain representation back into the original serial bit stream which may be forwarded, for example, to data device 210.

As discussed above, the receiver 400 and loading logic 230 determine a number of data bits to load in each tone based on the network conditions. According to an exemplary implementation of the present invention, receiver 400 takes into account ICI to determine the number of bits to load in each tone, as described in more detail below, and forwards this information to transmitter 300. Transmitter 300 may then forward the bit loading information to station 110 indicating the appropriate number of bits to load in each tone when transmitting data to station 120.

Figure 5:
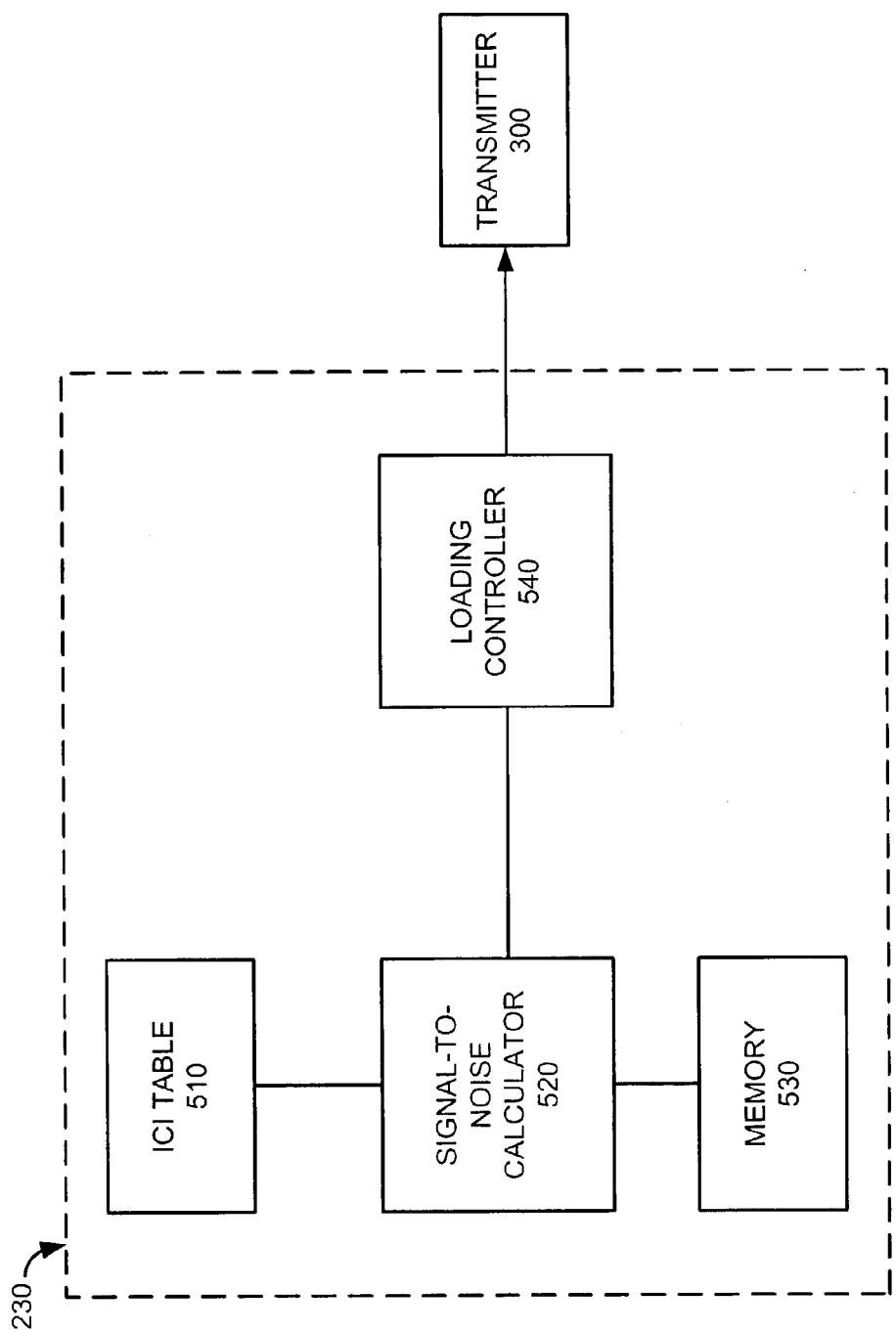
FIG. 5 is an exemplary detailed block diagram of the loading logic of FIG. 2, consistent with an implementation of the present invention.

FIG. 5 is an exemplary detailed diagram of loading logic 230 according to an implementation consistent with the present invention. Loading logic 230 includes an ICI table 510, signal-to-noise (SN) calculator 520, memory 530 and loading controller 540.

Memory 530 may include a conventional memory device, such as a conventional random access memory (RAM) device. ICI table 510 may be a conventional memory device that stores ICI data associated with DMT transmission. For example, ICI table 510 may store the estimated ICI for each of the 256 tones used in an exemplary DMT system. The ICI information for each tone may be determined during a design stage associated with network 100. The ICI may be determined using a worst case scenario or may be determined for a number of particular clock offsets.

If the ICI information is determined using a worst case scenario, the maximum offset in frequency between a clock at a transmitting node (e.g., station 110) and a clock at a receiving node (e.g., station 120) may be assumed. In addition, a worst case attenuation profile for the signals transmitted between stations 110 and 120 may be assumed. That is, a worst case signal attenuation value per tone may be assumed. The particular signal attenuation values may be different for each tone. The ICI for each tone may then be computed using the maximum frequency offset and the selected attenuation values. For example, simulations may be generated using the maximum frequency offset and selected attenuation values. The total amount of energy that leaks out of or into each particular tone may then be calculated. That is, the total energy that leaks out of a particular tone is determined. The sum of energies that leak into this particular tone from all the other tones may then be determined. These values are then summed to determine the maximum ICI for that particular tone. The process may then be repeated for each of the tones used in the DMT system.

It should be understood that the maximum frequency offset may be based on the type of crystal oscillators (i.e., clocks) used in stations 110 and 120 and their expected accuracies/tolerances. It should also be understood that the selected attenuation profile may be based on simulations performed for an exemplary DMT transmission system that includes two stations located a predetermined distance apart, such as a maximum distance, and connected by a predetermined channel medium. The distance between the stations and the type of channel medium employed may be chosen to emulate a typical generic network. This enables the determined ICI values to be used in any general purpose network. Alternatively, the simulations may be chosen to be specific to a particular network, such as network 100.

If the ICI is determined based on the particular clock offset, simulations may be generated using the selected clock offsets and the selected attenuation profile. The total amount of energy that leaks out of or into a particular tone may be determined at each clock offset. The process may be repeated for each tone at each particular clock offset. These values may be stored in ICI table 510.

The actual clock offset between transmitting station 110 and receiving station 120 may be estimated during training. Training refers to a period in which communications between two stations are initialized. In conventional DMT systems, two stations exchange handshaking information upon start-up. This information may include, for example, the particular protocol to be used between the two stations. The two stations may also perform channel analysis and exchange other information needed for transmitting and receiving data.

Station 120 may estimate the clock offset from station 110 by comparing the phase information associated with the pilot tone in successive symbols. Station 120 may then identify the ICI based on the clock offset.

Figure 6:
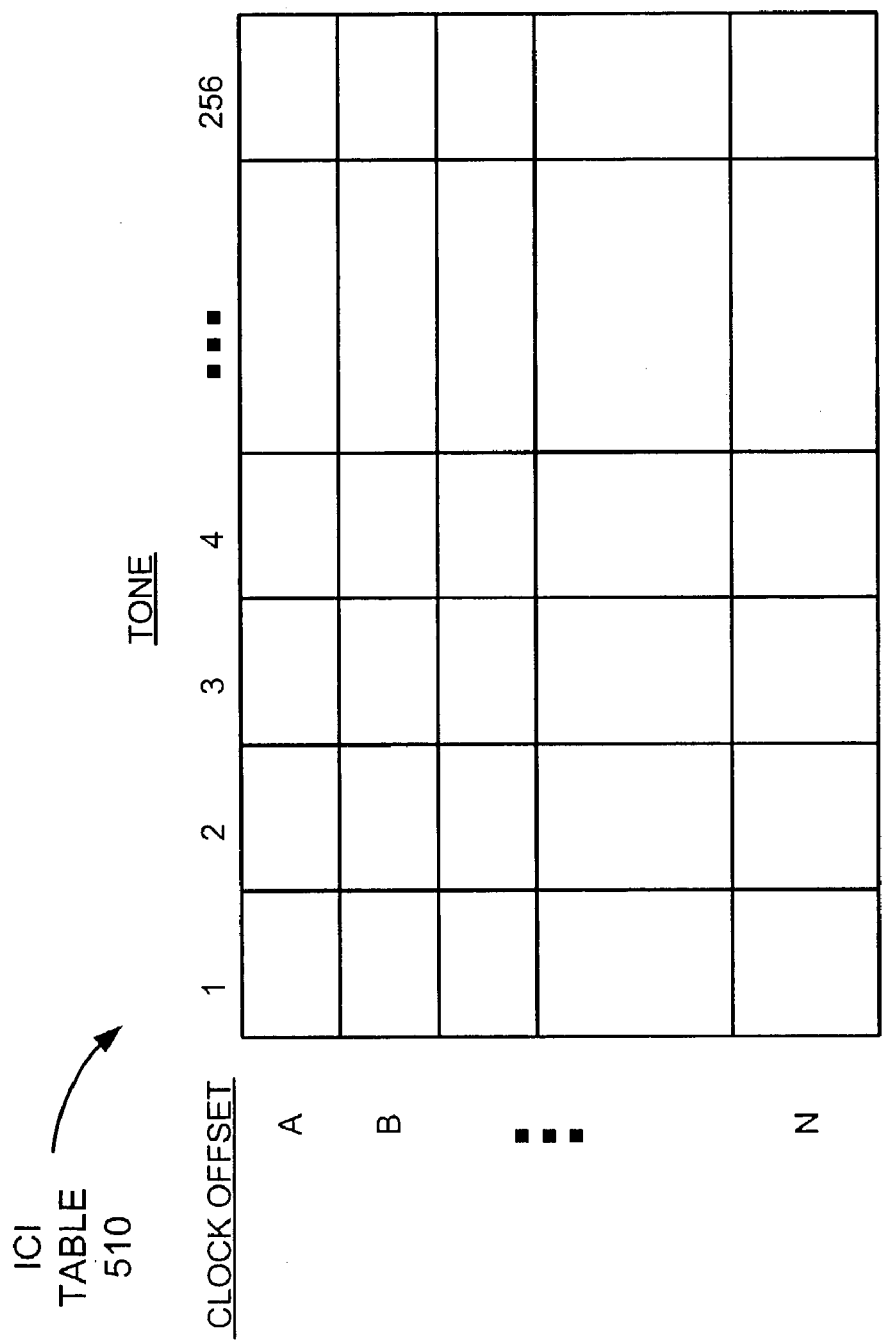
FIG. 6 illustrates an exemplary implementation of the ICI table of FIG. 5, consistent with an implementation of the present invention.

For example, FIG. 6 illustrates an exemplary configuration of ICI table 510 consistent with the present invention. Referring to FIG. 6, each of the entries in ICI table 510 stores ICI information for a particular tone based on a particular clock offset. For example, a DMT transmission system may use 256 discrete tones and ICI table 510 may include prestored ICI information for each of these respective tones for N different clock offsets. In this manner, after receiver 400 in station 120 estimates the clock offset, receiver 400 may access ICI table 510 to determine the ICI for each particular tone.

In the scenario described above with respect to determining ICI using a worst case scenario, ICI table 510 would only include a single row with the ICI information for each tone. That is, the worst case scenario would be used to estimate ICI for all transmissions. In this manner, station 120 will use the same ICI information when determining bit loading information for all stations in network 100. In either situation (ICI determined using a worst case scenario or ICI determined based on a particular clock offset), the ICI per tone information may be used to determine an effective signal-to-noise ratio (SNR), as described in more detail below.

Returning to FIG. 5, SN calculator 520 measures/estimates the noise per tone during training. As described previously, training refers to the period in which stations exchange handshaking information. In an exemplary implementation, during the training period, station 110 may transmit a number of signals to station 120. The signals may be transmitted on each of the 256 tones. Receiver 400 of station 120 receives the signals and SN calculator 520 estimates the noise component of each signal.

For example, in an exemplary implementation consistent with the present invention, SN calculator 520 may detect one or more inter-packet gaps (i.e., one or more periods of transmission inactivity) and determine an average noise energy over these gaps. It will be appreciated that any signal energy measured during an inter-packet gap would be considered "noise." The average noise energy may be continuously updated when inter-packet gaps are detected. Alternatively, the average noise energy may be updated at predetermined intervals. SN calculator 520 may store this value in memory 530. It should be understood that other techniques may be used to determine the noise energy per tone.

SN calculator 520 may then determine the effective signal-to-noise ratio for each tone based on the estimated received signal energy for each tone, the average noise energy stored in memory 530 and the ICI information stored in ICI table 510. For example, SN calculator 520 may determine/estimate the signal energy for each received tone. SN calculator 520 may then add the ICI per tone information stored in ICI table 510 to the measured/estimated average noise energy per tone stored in memory 530 to generate an effective noise per tone value. In alternative implementations, SN calculator 520 may perform processing on the ICI per tone information stored in ICI table 510 prior to adding the ICI per tone information to the measured/estimated noise per tone. SN calculator 520 may then divide the estimated signal energy for each tone by the effective noise per tone. This value represents the effective SNR for that tone.

Loading controller 540 receives the effective SNR and determines how many bits of information that station 110 should load per tone when transmitting data to station 120. For example, loading controller 540 may include a loading control algorithm that identifies how many bits to load per tone based on the effective SNR. For example, a large number of bits may be assigned to those tones that have a high SNR, while few bits, if any, may be assigned to those tones that have a low SNR. Loading controller 540 passes the bits per tone information to transmitter 300. Transmitter 300 may then transmit this information to station 110, which uses the bit loading information when transmitting data to station 120.

Loading logic 230 is illustrated in FIG. 2 as being a separate component from transceiver 220. It should be understood that in alternative implementations of the present invention, loading logic 230 may be part of transceiver 220. It should also be understood that loading logic 230 may be implemented in hardware, software or any combination of hardware and software. Thus, the present invention is not limited to any specific combination of hardware circuitry and software.

As discussed above, loading logic 230 works in conjunction with transceiver 220 to identify the number of bits that a transmitting station, such as station 110, should load per tone when transmitting data to a receiving station, such as station 120. Station 120, as described above, determines this information and then informs station 110 as to the appropriate bit loading information.

Figure 7:
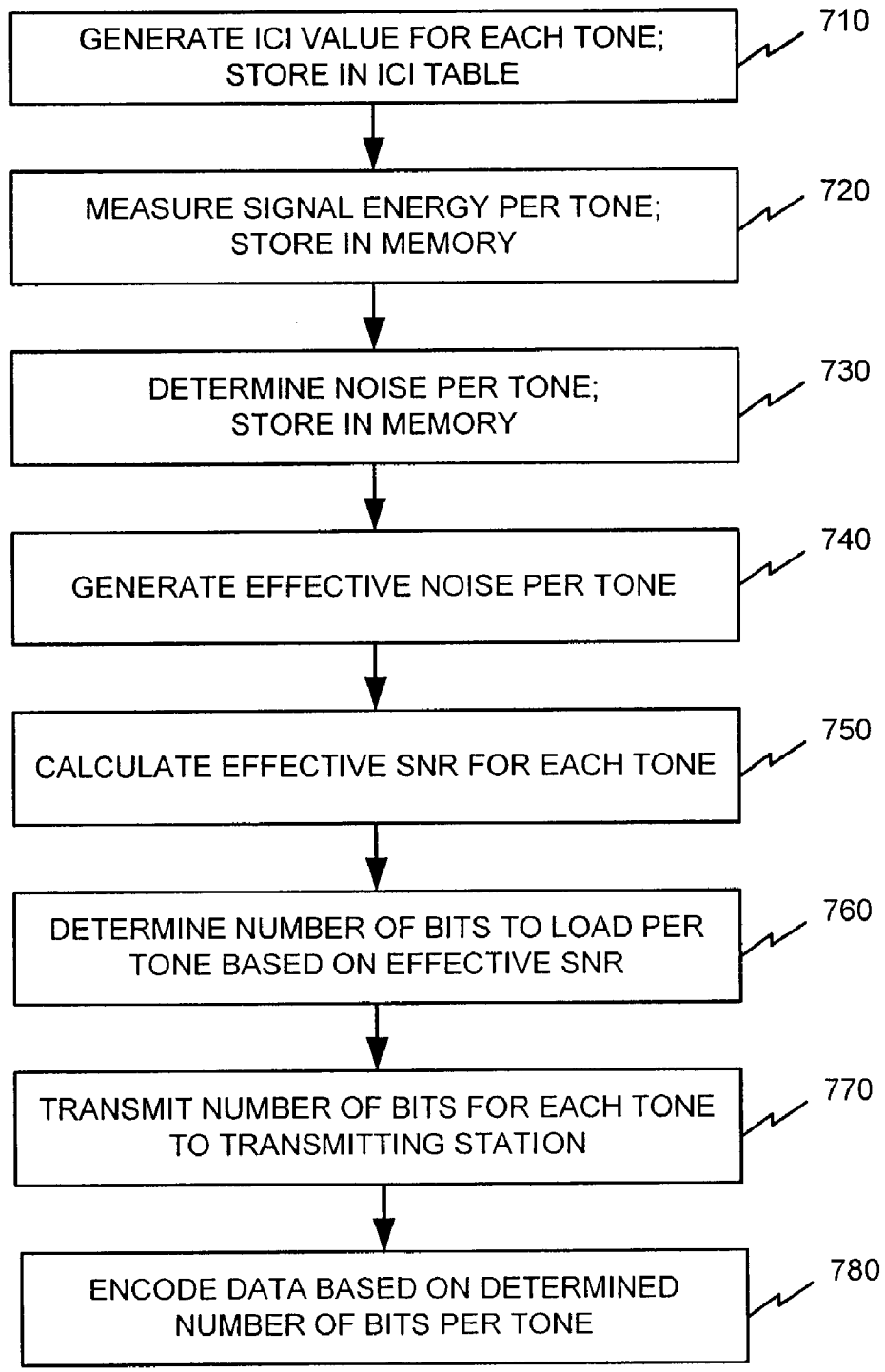
FIG. 7 is a flow diagram illustrating exemplary processing associated with transmitting data, consistent with an implementation of the present invention.

FIG. 7 illustrates exemplary processing associated with transmitting data in network 100 according to an implementation consistent with the present invention. Processing may begin by generating ICI information for network 100 (act 710). For example, as discussed above, the ICI information may be estimated during the design phase of network 100 based on a worst case scenario or based on a particular clock offset. As discussed above, if the ICI per tone values are generated using a worst case scenario, simulations for determining ICI assume a maximum clock offset and a worst case signal attenuation profile. The ICI values may then be stored in ICI table 510. Alternatively, simulations may be generated for determining ICI based on a number of different clock offsets and a selected attenuation profile.

If the ICI is determined based on a particular clock offset, the particular clock offset may be estimated during training. For example, station 110 may transmit a number of symbols to station 120. Station 120 may decode the symbols and compare the phase of successive pilot tones to estimate the clock offset. Station 120 may store this value in memory 530. This information may then be used as an index to ICI lookup table 510 to determine the ICI for each tone. For example, as discussed previously and illustrated in FIG. 6, ICI table 510 may include prestored ICI per tone information for a number of different clock offsets. These prestored ICI values may be based on simulations performed during the design stage using the particular clock offsets. The actual clock offset determination, however, is determined during training.

In either case, (ICI determined using worst case scenario or ICI determined for a number of clock offsets), the ICI values for each respective tone may be stored in ICI table 510 (act 710). If the ICI values were determined based on a worst case scenario, assume that network 100 starts up. Alternatively, if the network 100 has already started up, assume that the training process continues. The training process may include a handshaking procedure between stations 110 and 120. For example, the handshaking may indicate that the stations will communicate via DMT modulation and indicate the particular tones that will be used.

Stations 110 and 120 may also perform a channel analysis with respect to channel 130. For example, SN calculator 520 may measure the signal energy associated with each tone in any conventional manner (act 720). SN calculator 520 may store this information in memory 530 (act 720).

SN calculator 520 may then determine average noise energy associated with channel 130 (act 730). For example, as discussed above, in an exemplary implementation consistent with the present invention, station 120 may receive a number of signals from station 110. SN calculator 520 may detect one or more inter-packet gaps (i.e., one or more periods of transmission inactivity) and determine an average noise energy over these gaps. The average noise energy may be continuously updated when inter-packet gaps are detected. Alternatively, the average noise energy may be updated at predetermined intervals. SN calculator 520 may store the noise energy value in memory 530 (act 730). This value represents the average noise for each of the tones.

SN calculator 520 may then determine an effective SNR for each tone (act 740). For example, if the worst case scenario is being used, SN calculator 520 retrieves the ICI per tone from ICI table 510 and adds the estimated noise value stored in memory 530 to the ICI value for each tone to generate an effective noise value for each of the respective tones.

Alternatively, ICI per tone value may be based on the estimated clock offset. In this case SN calculator 520 retrieves the estimated clock offset information determined during training and stored in memory 530. SN calculator 520 may use this clock offset value as an index to ICI table 510. For example, if the estimated clock offset is "B," SN calculator 520 access row B of ICI table 510 to retrieve the ICI per tone values. SN calculator 520 then adds the estimated noise energy stored in memory 530 to each of the ICI values stored in line B of ICI table 510 to generate the effective noise values for each tone. In either situation, the effective noise per tone value includes the estimated noise associated with channel 130 and the ICI per tone values.

SN calculator 520 may then calculate an effective SNR for each tone (act 750). For example, SN calculator 520 may divide the estimated signal energy per tone (determined at act 720) stored in memory 530 by the effective noise for each tone (determined at act 740) to generate an effective SNR for each tone (act 750). This information may then be forwarded to loading controller 540.

Loading controller 540 may then determine the number of bits that station 110 should load in each tone when transmitting data to station 120 based on the effective SNR (act 760). For example, loading controller 540 may determine the number of bits for each respective tone based on the SNR ratio for each tone and a maximum error probability allowed. The number of bits loaded in each tone may vary based on the particular tone's SNR. For example, a tone with a higher SNR may be allocated more bits than a tone with a lower SNR. The bit loading may also be chosen so that the effective bit error rate (BER) is below a predetermined threshold. The bit loading may also include a predetermined margin of safety so that the number of bits loaded per tone achieves the desired BER with some room to spare. That is, the number of bits loaded per tone may be less than the maximum number of bits that could theoretically be loaded per tone. This may allow station 110 to account for other noise factors that may exist on channel 130 when transmitting data to station 120.

In any event, loading controller 540 forwards the allocated bits per tone to transmitter 300. Transmitter 300 may then transmit this information to station 110. That is, encoder 310 of station 120 may then transmit the bit loading information indicating the appropriate number of bits that station 110 should load in each tone when transmitting data to station 120 (act 770). This may also be part of the training process between stations 110 and 120.

Station 110 receives the bit loading information from station 120 (act 780). Station 110 decodes the bit loading information and identifies the number of bits to load in each tone when transmitting data to station 120 (act 780). Station 110 may then load each tone with the allocated number of bits when transmitting data to station 120. That is, encoder 310 of station 110 maps data bits in a serial bit stream to the tones such that each tone is loaded with the appropriate number of bits determined by station 120. In this manner, receiver 400 is able to account for ICI when determining the appropriate number of bits to load per tone. This enables stations 110 and 120 to communicate effectively over channel 130.

Station 110 may also use this bit loading information when transmitting data to other stations in network 100. For example, station 120 may represent a master station in network 100 and each other station, such as station 110, may communicate with station 110 upon start-up to identify the appropriate bit loading information to use when transmitting data in network 100. Alternatively, station 120 may represent the first station to which station 110 has communicated and station 110 may use the determined bit loading information when transmitting data to other stations in network 100. Station 120 may optionally use the bit loading information determined at act 760 when transmitting data to other stations, such as station 110.

ALTERNATIVE IMPLEMENTATION

Figure 8:
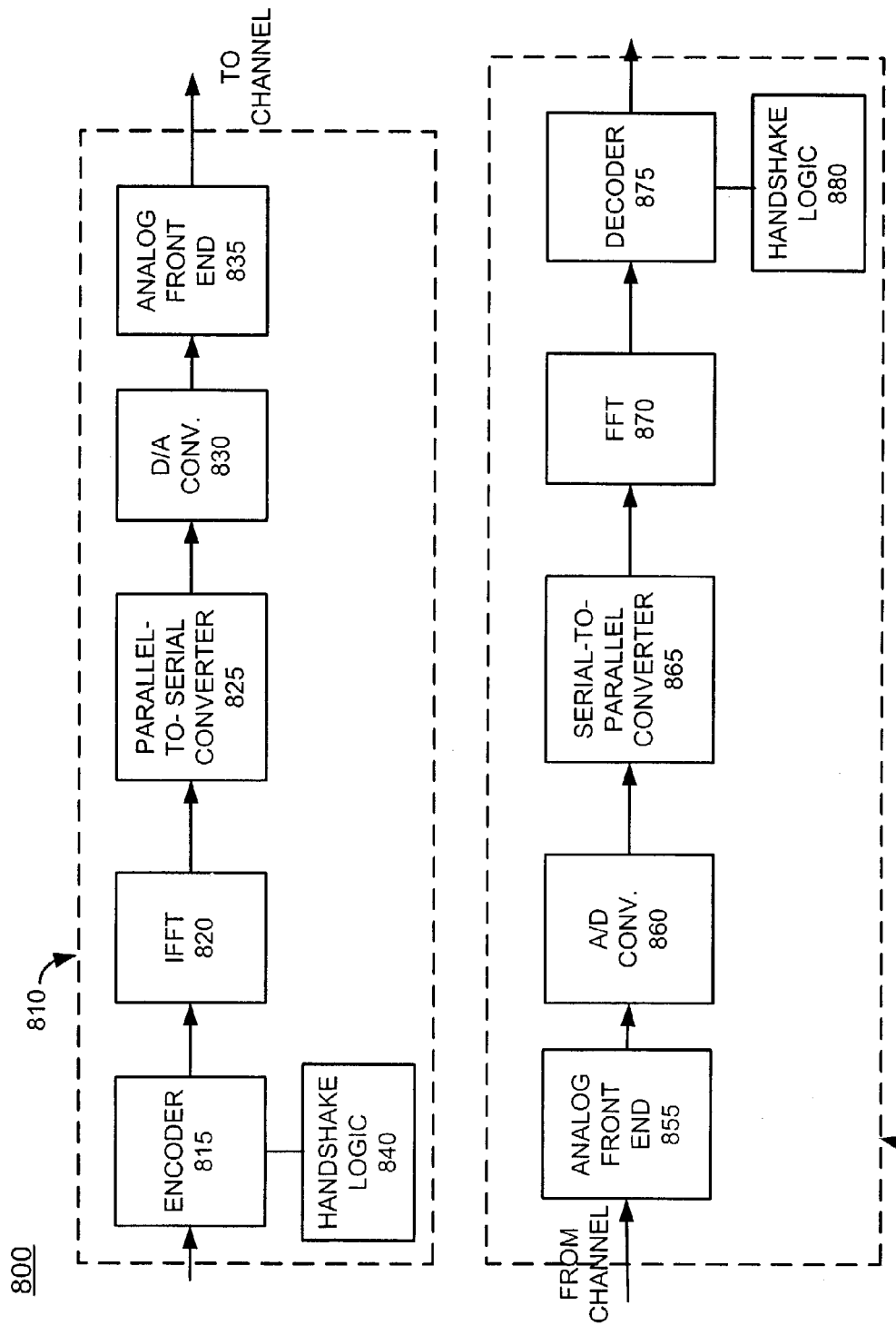
FIG. 8 is a block diagram of a transceiver according to an alternative implementation of the present invention

In an alternative implementation, transceivers with different A/D and D/A sampling rates and FFT sizes may transmit data at the maximum speed allowed by any one of these devices. FIG. 8 illustrates an exemplary block diagram of a transceiver consistent with this alternative implementation. Referring to FIG. 8, transceiver 800 includes a transmitter 810 and a receiver 850. Transmitter 810 includes an encoder 815, IFFT logic 820, parallel-to-serial converter 825, D/A converter 830 and AFE 835. These components perform similar functions as described above with respect to FIG. 3. Transmitter 810 also includes a handshake logic 840.

Receiver 850 includes AFE 855, A/D converter 860, serial-to-parallel converter 865, FFT logic 870 and decoder 875. These components perform similar functions as described above with respect to FIG. 4. Receiver 850 also includes handshake logic 880.

Assume that a first transceiver, such as transceiver 800, uses a sampling rate identified as fs1 and has an FFT size of N1 samples per symbol. According to this implementation, a second transceiver with N2 samples per symbol could interoperate with transceiver 800 provided its sampling rate (i.e., fs2) is equal to fs1*(N2/N1). That is, fs2=(fs1)(N2/N1). In this manner, numerous transceivers with different sampling rates could then be used together in the same network.

During handshaking, handshake logic 840 and 880 exchange information. For example, the FFT used by the two transceivers is exchanged. If one transmitter, such as transmitter 810, uses a bigger FFT size than another transceiver, it loads the data only into as many tones (starting from the lowest frequency tone) as the receiver can handle. If the receiver uses a bigger FFT size than the transmitter, then it decodes data only from as many tones as the transmitter can handle and again starts from the lowest frequency tone.

CONCLUSION

Described has been a system and method for accounting for ICI in a DMT transmission system. An advantage of the present invention is that the effective noise over a channel may be more accurately estimated by including the ICI information. Bit loading logic may then use this information to determine an appropriate number of bits that may be loaded in each tone without causing errors during transmission. As a result, data communications between stations may be improved.

Only the preferred embodiments of the invention and a few examples of its versatility are shown and described in the present disclosure. It is to be understood that the invention is capable of use in various other combinations and environments and is capable of modifications within the scope of the inventive concept as expressed herein.

For example, while the present invention has been described with respect to two stations transmitting data between themselves, the present invention may also be implemented in other network devices. In addition, a series of acts has been described with regard to FIG. 7, the order of the acts may be varied in other implementations consistent with the present invention. Moreover, non-dependent acts may be implemented in parallel. No element, act, or instruction used in the description of the present invention should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A first device configured to receive and transmit data over a network medium, comprising:
   a memory configured to store intercarrier interference (ICI) information for each of a plurality of respective tones used in a discrete multitone transmission system, wherein the ICI information stored in the memory comprises ICI per tone values for a number of clock offsets;
   logic configured to:
      receive a plurality of signals transmitted on the plurality of tones,
      estimate a noise value for each of the plurality of respective tones,
      generate an effective noise value for each of the plurality of respective tones using the ICI information and the estimated noise value for each of the plurality of respective tones,
      estimate a clock offset, and
      determine a signal-to-noise ratio (SNR) for each of the plurality of respective tones using the effective noise values;
   wherein when generating an effective noise value for each of the plurality of respective tones, the logic is further configured to:
      identify ICI information corresponding to the estimated clock offset for each of the tones, and
      add the identified ICI information for each of the tones to the estimated noise value for each of the corresponding tones; and
   a transmitter configured to transmit bit loading information to a second device, the bit loading information being based on the determined SNR.

2. The first device of claim 1, wherein the bit loading information identifies a number of bits to load on each of the plurality of tones.

3. The first device of claim 1, wherein the transmitter is further configured to:
   transmit data to other devices using the bit loading information.

4. The first device of claim 1, wherein when determining a SNR for each of the plurality of respective tones, the logic is configured to:
   determine a signal energy value for each of the plurality of tones, and divide the signal energy value for each of the plurality of respective tones by the effective noise value associated with the corresponding tone.

5. The first device of claim 1, wherein the ICI information stored in the memory is based on the estimated clock offset between the first device and the second device and an assumed signal attenuation per tone associated with transmitting data over the network medium.

6. The first device of claim 1, wherein when estimating a clock offset, the logic is configured to:
receive a first symbol including a first pilot tone,
receive a second symbol including a second pilot tone,
compare phase information associated with the first and second pilot tones, and
determine a clock offset based on the comparison.

7. The first device of claim 1, wherein when estimating the noise value for each of the plurality of tones, the logic is configured to:
estimate a noise energy value based on one or more periods of transmission inactivity.

8. In a first network device that transmits data using discrete multitone (DMT) modulation, a method comprising:
storing intercarrier interference (ICI) information in a memory;
receive a plurality of signals transmitted on each of a plurality of tones;
estimating an amount of noise associated with each of the plurality of tones;
estimating an amount of signal energy associated with each of the plurality of tones;
calculating an effective noise value for each of the plurality of tones using the ICI information and the estimated amount of noise associated with each of the plurality of tones;
calculating a signal-to-noise ratio (SNR) for each of the plurality of tones using the estimated amount of signal energy associated with each of the plurality of tones and the effective noise value for each of the plurality of tones; and
determining bit loading information for each tone based on the SNR for each of the plurality of tones,
wherein the storing ICI information in a memory comprises:
selecting a clock offset value representing a clock offset between the first device and a second device,
selecting a plurality of signal attenuation values associated with the respective plurality of tones,
using the selected clock offset value and the plurality of signal attenuation values to determine the ICI for each of the plurality of tones, and
storing the ICI value for each of the plurality of tones in the memory.

9. The method of claim 8, further comprising:
transmitting the bit loading information to a second network device, the bit loading information identifying a number of bits to load in each tone by the second network device when transmitting data.

10. The method of claim 8, wherein the calculating an effective noise value for each of the plurality of tones comprises,
adding ICI information for each respective tone stored in the memory to the estimated amount of noise for each respective tone.

11. The method of claim 10, wherein the calculating a SNR for each of the plurality of tones comprises:
dividing the signal energy for each of the plurality of respective tones by the effective noise value associated with the corresponding tone.

12. In a first network device that transmits data using discrete multitone (DMT) modulation, a method comprising:
storing intercarrier interference (ICI) information in a memory;
receive a plurality of signals transmitted on each of a plurality of tones;
estimating an amount of noise associated with each of the plurality of tones;
estimating an amount of signal energy associated with each of the plurality of tones;
calculating an effective noise value for each of the plurality of tones using the ICI information and the estimated amount of noise associated with each of the plurality of tones;
calculating a signal-to-noise ratio (SNR) for each of the plurality of tones using the estimated amount of signal energy associated with each of the plurality of tones and the effective noise value for each of the plurality of tones; and
determining bit loading information for each tone based on the SNR for each of the plurality of tones,
wherein the storing ICI information in a memory comprises:
determining ICI per tone values for a number of clock offsets, and
wherein the calculating an effective noise value for each of the plurality of tones includes:
estimating a clock offset,
identifying ICI information corresponding to the estimated clock offset for each of the tones, and
adding the identified ICI information for each of the tones to the estimated noise for each of the corresponding tones.

13. A first network device in a discrete multitone (DMT) transmission network, comprising:
a memory configured to store intercarrier interference (ICI) information associated with at least one of a plurality of discrete tones, wherein the memory stores ICI information calculated using a preselected clock offset and a preselected signal attenuation value per tone; and
logic configured to:
calculate a signal-to-noise ratio (SNR) for each of the plurality of discrete tones using the stored ICI information, and
generate bit loading information based on the SNR.

14. The first network device of claim 13, wherein the logic is further configured to:
transmit the bit loading information to a second network device based on the calculated SNR, wherein the second network device uses the bit loading information when transmitting data to the first network device.

15. The first network device of claim 13, wherein when calculating the SNR for each of the plurality of discrete tones, the logic is configured to:
receive data signals from a second network device,
estimate an amount of signal energy for each of the plurality of discrete tones based on the received data signals,
estimate an amount of noise for each of the plurality of discrete tones based on at least one inter-packet gap,
add the estimated amount of noise for each of the plurality of discrete tones to ICI information associated with each corresponding tone to generate a first value for each tone, and
divide the estimated amount of signal energy for each respective tone by the first value associated with the respective tone.

16. A first network device in a discrete multitone (DMT) transmission network, comprising:
  a memory configured to store intercarrier interference (ICI) information associated with at least one of a plurality of discrete tones, wherein the memory stores ICI information associated with each of the plurality of discrete tones for each of a number of clock offsets; and
  logic configured to:
    calculate a signal-to-noise ratio (SNR) for each of the plurality of discrete tones using the stored ICI information, and
    generate bit loading information based on the SNR.

* * * * *